US010808342B2

(12) United States Patent
Andoh et al.

(10) Patent No.: US 10,808,342 B2
(45) Date of Patent: Oct. 20, 2020

(54) METHOD FOR MANUFACTURING FISHING NET

(71) Applicant: UNITIKA LTD., Amagasaki-shi, Hyogo (JP)

(72) Inventors: Hidehito Andoh, Uji (JP); Kohei Ikeda, Uji (JP)

(73) Assignee: UNITIKA LTD., Hyogo (JP)

( * ) Notice: Subject to any disclaimer, the term of this patent is extended or adjusted under 35 U.S.C. 154(b) by 189 days.

(21) Appl. No.: 16/033,904

(22) Filed: Jul. 12, 2018

(65) Prior Publication Data
US 2019/0017203 A1    Jan. 17, 2019

(30) Foreign Application Priority Data

Jul. 14, 2017   (JP) .................................. 2017-137883
Jan. 4, 2018   (JP) .................................. 2018-000066
May 18, 2018   (JP) .................................. 2018-096346

(51) Int. Cl.
*B29C 65/00*    (2006.01)
*D04H 3/045*    (2012.01)
(Continued)

(52) U.S. Cl.
CPC .............. *D04H 3/045* (2013.01); *A01K 75/00* (2013.01); *B29C 66/7292* (2013.01);
(Continued)

(58) Field of Classification Search
CPC ....... B29C 65/02; B29C 65/022; B29C 66/02; B29C 66/022; B29C 66/05;
(Continued)

(56) References Cited

U.S. PATENT DOCUMENTS

| 2,894,366 A * | 7/1959 | Leckie ................. A01K 73/053 |
| | | 57/233 |
| 2006/0272196 A1* | 12/2006 | Safwat .................. A01K 73/02 |
| | | 43/9.95 |

(Continued)

FOREIGN PATENT DOCUMENTS

| JP | 2001271270 A | 10/2001 |
| JP | 2002-249971 | 9/2002 |

(Continued)

OTHER PUBLICATIONS

Office Action issued in the corresponding Norwegian Patent Application No. 20181438, dated Oct. 10, 2019, 6 pages.

(Continued)

*Primary Examiner* — Mark A Osele
*Assistant Examiner* — Nickolas R Harm
(74) *Attorney, Agent, or Firm* — Hamre, Schumann, Mueller & Larson, P.C.

(57) ABSTRACT

Provided is a method for manufacturing a fishing net formed from a plastic net that can be handled by winding or folding although the net has plastic rigidity. The fishing net is manufactured by (1) a step of preparing a multifilament yarn formed by bundling a plurality of core-sheath type composite filaments, in each of which a core component is made of polyethylene terephthalate and a sheath component is made of polyolefin, (2) a step of preparing a yarn thread obtained by paralleling a plurality of the multifilament yarns, (3) a step of twisting or braiding four yarn threads 11, 12, 13, 14 to obtain a net constructed with strands 1 and intersections 2, (4) a step of heat-treating the net under without pressure to melt the sheath component of the yarn threads 11, 12, 13, 14 constituting the strands 1 and the intersections 2, followed by solidifying, thus obtaining a plastic net, and (5) a step of forming the fishing net using the plastic net.

4 Claims, 3 Drawing Sheets

(51) Int. Cl.

| | |
|---|---|
| *D04C 1/06* | (2006.01) |
| *D04C 1/02* | (2006.01) |
| *D02G 3/02* | (2006.01) |
| *D04H 3/147* | (2012.01) |
| *D04H 3/007* | (2012.01) |
| *D04H 3/011* | (2012.01) |
| *D04H 3/018* | (2012.01) |
| *A01K 75/00* | (2006.01) |
| *D02G 3/44* | (2006.01) |
| *B29D 28/00* | (2006.01) |
| *B29K 667/00* | (2006.01) |
| *D02G 3/36* | (2006.01) |
| *B29L 28/00* | (2006.01) |
| *B29K 623/00* | (2006.01) |
| *B29C 65/02* | (2006.01) |
| *D01F 8/14* | (2006.01) |
| *B29K 67/00* | (2006.01) |
| *D01F 8/06* | (2006.01) |
| *D01D 5/34* | (2006.01) |
| *D02G 3/04* | (2006.01) |
| *D01C 1/02* | (2006.01) |

(52) U.S. Cl.
CPC .............. *B29D 28/00* (2013.01); *D02G 3/02* (2013.01); *D02G 3/44* (2013.01); *D04C 1/02* (2013.01); *D04C 1/06* (2013.01); *D04H 3/007* (2013.01); *D04H 3/011* (2013.01); *D04H 3/018* (2013.01); *D04H 3/147* (2013.01); B29C 65/02 (2013.01); B29C 65/022 (2013.01); B29C 66/02 (2013.01); B29C 66/022 (2013.01); B29C 66/05 (2013.01); B29C 66/4346 (2013.01); B29C 66/69 (2013.01); B29C 66/71 (2013.01); B29K 2023/06 (2013.01); B29K 2067/003 (2013.01); B29K 2623/06 (2013.01); B29K 2667/003 (2013.01); B29L 2028/00 (2013.01); D01C 1/02 (2013.01); D01D 5/34 (2013.01); D01F 8/06 (2013.01); D01F 8/14 (2013.01); D02G 3/04 (2013.01); D02G 3/36 (2013.01); D10B 2321/021 (2013.01); D10B 2331/04 (2013.01); D10B 2507/02 (2013.01)

(58) Field of Classification Search
CPC ..... B29C 66/4346; B29C 66/69; B29C 66/71; D02G 3/02; D02G 3/04; D02C 1/02; D04H 3/007
See application file for complete search history.

(56) References Cited

U.S. PATENT DOCUMENTS

| | | | |
|---|---|---|---|
| 2013/0205979 A1 | 8/2013 | Nelis et al. | |
| 2016/0145796 A1* | 5/2016 | Yin | B66C 1/18 57/237 |
| 2016/0249594 A1* | 9/2016 | Gunnarsson | A01K 73/02 87/7 |
| 2016/0258089 A1* | 9/2016 | Erlendsson | D04C 1/12 |

FOREIGN PATENT DOCUMENTS

| | | |
|---|---|---|
| JP | 2008-184695 | 8/2008 |
| JP | 2009299209 A | 12/2009 |
| JP | 2016-056487 | 4/2016 |
| JP | 2017-197856 | 11/2017 |
| WO | 2011/135082 | 11/2011 |
| WO | 2016/162569 | 10/2016 |

OTHER PUBLICATIONS

Office Action issued in Japanese Patent Application No. 2018-000345, dated Mar. 9, 2018, 6 pages including English translation.
Office Action issued in Japanese Patent Application No. 2018-000346, dated Mar. 9, 2018, 4 pages including English translation.
Notification of Examiner's report, Examiner's report and Search report issued for Chilean Patent Application No. 2018-01872, dated Nov. 19, 2019, 16 pages.

* cited by examiner

METHOD FOR MANUFACTURING FISHING NET

BACKGROUND OF THE INVENTION

Technical Field

The present invention relates to a method for manufacturing a fishing net having high strength, particularly to a method for manufacturing a fishing net composed of a plastic net.

Background Art

Conventionally, it has been well known that a core-sheath type composite filament comprising a core component formed from polyethylene terephthalate and a sheath component formed from polyester copolymer or polyolefin having a melting point lower than that of polyethylene terephthalate is used as a material for a mesh sheet. It has also been well known that a coarse fabric is woven using a multifilament yarn made of core-sheath type composite filaments as warp and weft, and that an intersection of the warp and the weft is fused by melting the sheath component by heat treatment to form the mesh sheet (see JP 2001-271270 A and JP 2009-299209 A). In this context, the intersection of the warp and the weft is fused for preventing mesh slippage. The fusion of the intersections can be generated at a pressure from both upper side and lower sides, even if it is conducted by non-pressure heat treatment, the warp and the weft outside the intersections are hardly fused in the heat treatment, such that some of the intersections are selectively fused. The mesh sheet is generally covered on an outside surface of a temporary structure such as a scaffold at a construction site and is used for preventing foreign falling objects and the like from jumping out of the temporary structure, so that there is no drawback even if some of portions except for the intersections are not fused.

However, a high-rigid plastic sheet in which portions outside the intersections are fused is sometimes necessary for industrial applications except for the mesh sheet. For example, a culturing fishing net, which is one of the fishing nets, is easily worn down by continuous contacts with fishes, and fishes may cut off the net by its mouth, so that a plastic type sheet is very suitable for a culturing fishing net. In order to obtain the plastic sheet, it is considered that heat treatment is performed while the sheet is pressed as described in JP 2001-271270 A and JP 2009-299209 A. However, when heat treatment is conducted under pressure for producing the plastic sheet, the sheet becomes very rigid and can only be treated in the form of a flat plate, because it is very difficult to wind it up as a scroll.

SUMMARY OF THE INVENTION

An object of the present invention is to provide a method for manufacturing a fishing net comprising a plastic net, which can be easily handled by winding or folding even though the net has plastic rigidity.

DETAILED DESCRIPTION OF THE PREFERRED EMBODIMENTS

The present invention provides a method for manufacturing a fishing net comprising a plastic net, wherein strands and intersections are formed by a specific method using a specific core-sheath type composite filament and then heat treating to obtain the plastic net, thus solving the above problem. According to one aspect of the present invention, a method for manufacturing a fishing net comprises the following steps:

a step of preparing a multifilament yarn formed by bundling a plurality of polyester polyolefin-based core-sheath type composite filaments, in each of which a core component is made of polyethylene terephthalate and a sheath component is made of polyolefin, a mass ratio of the core component and the sheath component being core component:sheath component=1 to 3:1;

a step of preparing a yarn thread obtained by paralleling a plurality of the multifilament yarns;

a step of either twisting a plurality of the yarn threads to obtain a net constructed with strand and intersections, or braiding the plurality of the yarn threads to obtain a net constructed with strands and intersections:

a step of heat-treating the net without pressure to melt the sheath component of the yarn threads constituting the strands and the intersections, followed by solidifying, thus obtaining a plastic net constructed with the solidified strands and the solidified intersections, in which the core component is existent as an initial fiber form in a matrix formed of the sheath component; and a step of forming a fishing net using the plastic net.

In the present invention, the polyester polyolefin based core-sheath type composite filament having the core component of polyethylene terephthalate and the sheath component of polyolefin is prepared. In the core-sheath type composite filament, the mass ratio of the core component to the sheath component is core component:sheath component=1 to 3:1. The polyolefin which is use for the sheath component would form a matrix of a fiber-reinforced plastic material. Consequently, when the mass ratio of the sheath component is lower than the lower limit of the above range, the polyolefin hardly forms the matrix. When the mass ratio of the sheath component is higher than the upper limit of the above range, a diameter or a number of the core component decreases and the strength of the fiber-reinforced plastic material deteriorates. Fineness of the core-sheath type composite filament ranges from about 4 dtex to 20 dtex. A plurality of core-sheath type composite filaments are bundled to form a multifilament yarn. The number of bundled filaments can be within the range of about 30 to 400.

Figure 1:
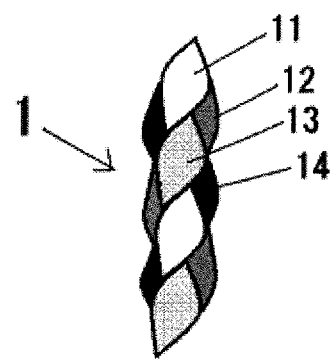
FIG. 1 is a schematic plan view illustrating a strand according to an example of a plastic net used in the present invention.

Subsequently, a plurality of multifilament yarns are paralleled to obtain a yarn thread. The number of paralleled yarns can be about 5 to about 20. The net constructed with strands and intersections may be obtained by applying the plurality (for example, 2 lines to 10 lines) of yarn threads to a twisted knotless net making machine or a Russell knitting machine. The plurality (for example, 2 lines to 10 lines) of yarn threads may also be applied to a braided web machine to braid the plurality of yarn threads and to form a net constructed with the strands 1 and the intersections 2. In the present specification, the term "intersection" is meant by a portion at which adjacent strands are crossed with each other. FIG. 1 is a schematic diagram illustrating the strand 1 in which four yarn threads 11, 12, 13, and 14 are braided with the braided web machine. The strand 1 is formed by repeating a process of crossing the yarn thread 11 with the yarn thread 12, crossing the yarn thread 12 with the yarn threads 11 and 13, crossing the yarn thread 13 with the yarn threads 12 and 14, and crossing the yarn thread 14 with the yarn thread 13. When the yarn threads are braided, each yarn thread may not be twisted or may be twisted. By twisting the yarn thread, the core-sheath type composite filaments constituting the strands 1 and the intersections 2 are intimately contacted so as to improve the rigidity of the fishing net. Accordingly, whether the yarn thread is twisted and how much extent the yarn thread is twisted may be determined in consideration of a balance between rigidity and flexibility of the fishing net. The intersections 2 may be formed in the form of knot by binding the strands 1, 1 formed as a braid, but it can preferably be in the form of knotless by penetrating the yarn threads 11, 12, 13, and 14 constituting the two strands 1, 1 into one another (see FIG. 2). The net is mainly used as a fishing net such as a culturing fishing net, so that the knotless net without having roughness formed by knots is preferable due to little damage to fishes.

The obtained net is subjected to heat treatment. Even when the polyester polyolefin-based core-sheath type composite filament is used, a heat treatment temperature is higher than or equal to a melting point of polyolefin of the sheath component, for example ranging from about 140° C. to about 200° C. Only the sheath component of the core-sheath type composite filament constituting the yarn thread is melted by the heat treatment. The heat treatment is conducted without pressure, thus imparting flexibility and being easily wounded. When the sheath component is cooled after the heat treatment, the melted sheath component is solidified, and the solidified strands 1 and the solidified intersections 2 constitute fiber-reinforced plastic material in a matrix of the sheath component. In the case where the yarn threads are braided in the present invention, the strands 1 and the intersections 2 are constructed in a braided form and the core-sheath type composite filaments constituting the yarn thread are in close and strong contact with each other, thus the melted sheath component easily forms the matrix even if the heat treatment is conducted without pressure. As a result, the solidified strands 1 and the solidified intersections 2 are formed to the fiber-reinforced plastic material in which the core component maintaining the original fiber form is present in the matrix formed by melting and solidifying the sheath, to obtain the plastic net constructed with the fiber-reinforced plastic material. The resulting plastic net is employed and fabricated into fishing nets, such as a fixed fishing net, a cage fishing net and a culturing fishing net.

The plastic net obtained by the process of the present invention is constructed with the strands 1 and the intersections 2. A region surrounded by the strands 1 and the intersections 2 is an opening and is referred to as a mesh 3.

Figure 3:
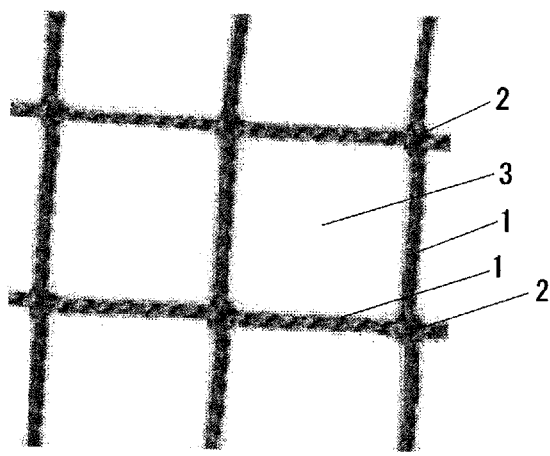
FIG. 3 is a photograph illustrating an example of the plastic net used in the present invention in planar view.

As illustrated in FIG. 3, a shape of the mesh 3 may be a square mesh, or can be another form such as a rhomboid mesh. The intersections 2 can preferably be knotless as illustrated in FIG. 3, but the intersections 2 may be in the form of a knot. A diameter of the strand 1 ranges from about 2 mm to about 7 mm and an area of the intersection 2 ranges from about 25 $mm^2$ to about 80 $mm^2$. An area of the mesh 3 ranges from about 2 $cm^2$ to about 20 $cm^2$.

Figure 4:
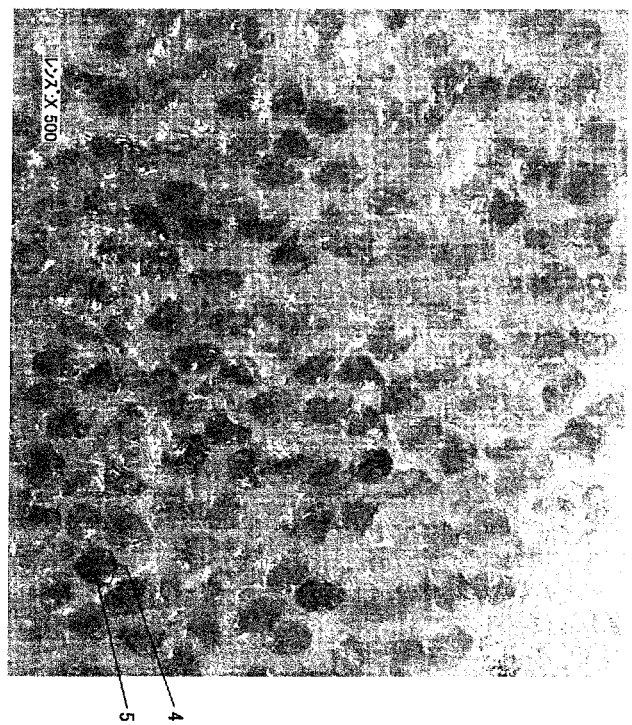
FIG. 4 is a photograph when a cross section of the strand according to an example of the plastic net used in the present invention is observed with a microscope.

The solidified strands 1 and the solidified intersections 2 are formed by the fiber-reinforced plastic material in which the sheath component constitutes the matrix and the core component exists in the matrix as an initial fibrous form. That is, in the case where the polyester polyolefin-based core-sheath type composite filament is used, a fiber-reinforced plastic material in which the olefin constitutes a matrix and a plurality of polyethylene terephthalate filaments 5 are present in the matrix is formed. FIG. 4 is a photograph when a cross section of the strand 1 of a plastic net obtained using the polyester polyolefin based core-sheath type composite filament is observed with a microscope. In FIG. 4, the whitish region is polyolefin which constitutes the matrix. In FIG. 4, a dark region is a cross section of the polyethylene terephthalate filament 5. A mass ratio of the polyolefin 4 and the polyethylene terephthalate filament 5 is polyolefin:polyethylene terephthalate filament=1:1 to 3. When a mass ratio of polyolefin is lower than this range, polyolefin hardly constitutes the matrix. On the other hand, when a mass ratio of the polyolefin is higher than this range, the diameter or number of the polyethylene terephthalate filament is small and the strength of the fiber-reinforced plastic material is deteriorated. The polyolefin may include polyethylene, polypropylene or polyethylene-polypropylene copolymer, but the polyolefin that constitutes the matrix shown in the photograph of FIG. 4 is polyethylene. In the present invention, the use of polyethylene can effectively exert an effect that the easy-to-handle fishing net formed by the plastic net can be conveyed as a scroll form before and after use while keeping the high strength and rigidity during use.

In the case where the polyester polyolefin-based core-sheath type composite filament is used in the fishing net obtained by the method of the present invention, the solidified strands and the solidified intersections are made of the high-strength fiber-reinforced plastic material in which the polyethylene terephthalate filament in which polyolefin such as polyethylene is the matrix is enclosed. Polyolefin such as polyethylene has flexibility and polyolefin and polyethylene terephthalate filament have low compatibility with each other, so that fishing net is easily wound and folded even though it is plastic. Therefore, the easy-to-handle fishing net formed by the plastic net can be conveyed as the scroll before and after use while having the high strength and rigidity during use.

EXAMPLES

Example 1

A core-sheath type composite filaments having the fineness of about 8.7 dtex with core component:sheath component=3:1 (the mass ratio) was prepared from a core component made of polyethylene terephthalate having a melting point of 260° C. and a sheath component made of polyethylene having a melting point of 130° C. Then, 192 core-sheath type composite filaments were bundled to obtain the multifilament yarns of 1670 dtex/192 filaments. Eight multifilament yarns were paralleled to obtain a yarn thread.

Three yarn threads were applied to a twisted knotless net making machine while twisted to obtain a knotless net. The knotless net was introduced into a pin tenter type heat treatment apparatus and subjected to a heat treatment in an atmosphere at 150° C. for 3 minutes while tension is applied in the width direction of the knotless net. Subsequently, the knotless net was left at a room temperature and cooled to obtain the plastic net. In the plastic net, the diameter of the strand was about 4 mm, a knotless area was about 50 mm$^2$, the mesh was square, and an area of the mesh was about 10 cm$^2$. A culturing fishing net having a tubular parallelepiped shape was obtained using the plastic net.

Example 2

Figure 2:
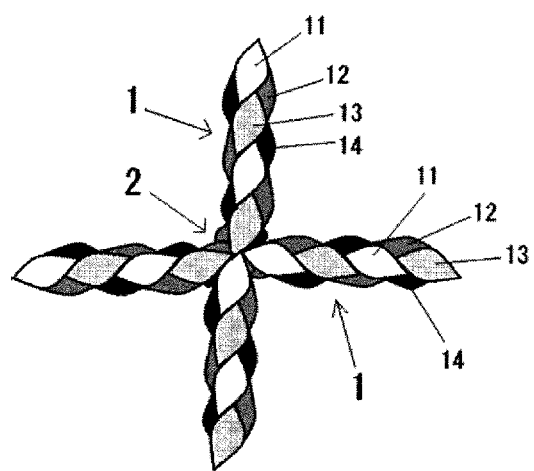
FIG. 2 is a schematic plan view illustrating a part of strands and intersections according to an example of the plastic net used in the present invention.

The polyester polyolefin-based core-sheath type composite filament having the fineness of about 8.7 dtex with core component:sheath component=3:1 (the mass ratio) were prepared using the core component made of polyethylene terephthalate having a melting point of 260° C. and the sheath component made of polyethylene having a melting point of 130° C. Then, 192 core-sheath type composite filaments were bundled to obtain the multifilament yarns of 1670 dtex/192 filaments. Eight multifilament yarns were paralleled to obtain the yarn thread. Four yarn threads were applied to a braided web machine and braided, to obtain a knotless net including the strands 1 and the intersections 2 as illustrated in FIG. 2. The knotless net was introduced into a pin tenter type heat treatment apparatus, and subjected to a heat treatment in an atmosphere at 150° C. for 3 minutes while tension is applied in the width direction of the knotless net. Then, the knotless net was left at a room temperature and cooled to obtain the plastic net. In the resultant plastic net, a diameter of the strand was about 4 mm, a knotless area was about 50 mm$^2$, the mesh was square, and an area of the mesh was about 10 cm$^2$. A culturing fishing net having a tubular parallelepiped shape was obtained using the plastic net.

Comparative Example 1

A plastic net was obtained as generally described in Example 1, except that the sheath component was changed to copolymerized polyester having a melting point of 160° C. and that an atmospheric temperature during the heat treatment was changed to 180° C. and then a culturing fishing net having a tubular parallelepiped shape was obtained using the plastic net.

Comparative Example 2

A plastic net was obtained as generally described in Example 2, except that the sheath component was changed to copolymerized polyester having a melting point of 160° C. and that an atmospheric temperature during the heat treatment was changed to 180° C. and then a culturing fishing net having a tubular parallelepiped shape was obtained using the plastic net.

Although all the plastic nets obtained by the methods according to Examples 1 and 2 and Comparative Examples 1 and 2 were strong, the plastic nets of Comparative Examples 1 and 2 were hardly wound in comparison with the plastic nets obtained in Examples 1 and 2. This is because the strands and the intersections of the latter plastic nets were made of the fiber-reinforced plastic material in which the matrix was copolymerized polyester. That is, copolymerization polyester has poor flexibility compared with polyethylene, and is highly compatible with polyethylene terephthalate filament, so that the fiber-reinforced plastic material constituting the strands and the intersections is rigid.

[Measurement of Intersection Strength]

Figure 5:
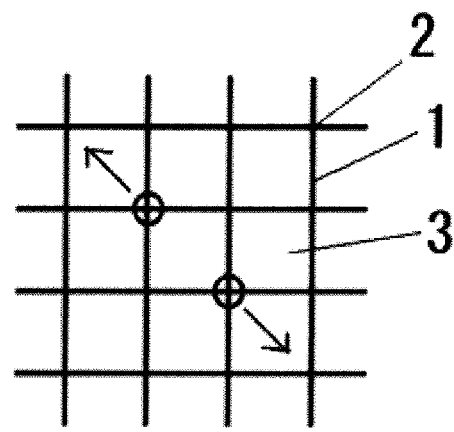
FIG. 5 is a schematic diagram illustrating a state of a test piece in measuring intersection strength of plastic nets obtained in Examples and Comparative Examples.

A test piece consisting a total of 9 meshes, of which 3 meshes are in a longitudinal direction and 3 meshes are in a longitudinal direction, as shown in FIG. 5 was taken from the plastic nets obtained in Example 2 and Comparative Example 2. An intersection surrounded by a mark O in FIG. 5 was hooked and pulled in an arrow direction and its strength (intersection strength) was measured when the intersection was broken. An autograph manufactured by Shimadzu Corporation was used as a measuring instrument and the measurement was conducted under a condition of a tensile speed of 10 cm/min. As a result, the plastic net of Example 2 had an intersection strength of 2206 N, and that of Comparative Example 2 had an intersection strength of 2096 N.

[Measurement of Tensile Strength]

Figure 6:
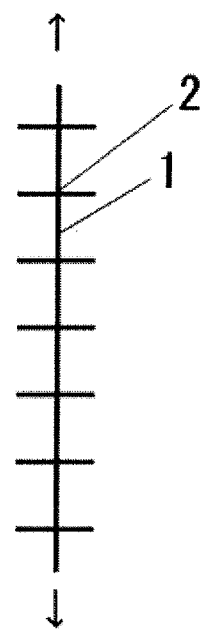
FIG. 6 is a schematic diagram illustrating the state of a test piece in measuring tensile strength of the plastic nets obtained in Examples and Comparative Examples.

From the plastic nets obtained in Example 2 and Comparative Example 2, a central portion of the strands in a weft direction was cut in parallel to a warp direction to obtain a test piece as shown in FIG. 6. The upper and lower ends in FIG. 6 were grasped by a chuck and pulled in an arrow direction to measure a strength (tensile strength) when the strand in the warp direction was cut. An autograph manufactured by Shimadzu Corporation was used as a measuring instrument, and a measurement was conducted under conditions of a distance between the chucks of 25 cm and the tensile speed of 30 cm/min. As a result, the plastic net of Example 2 was 2020 N, and that of Comparative Example 2 was 1713 N.

What is claimed is:

1. A method for manufacturing a fishing net, the method comprising:
   preparing a multifilament yarn formed by bundling a plurality of polyester polyolefin-based core-sheath type composite filaments, in each of which a core component is made of polyethylene terephthalate and a sheath component is made of polyolefin, a mass ratio of the core component and the sheath component being core component sheath component=1 to 3:1;
   preparing a plurality of yarn threads, each yarn thread obtained by paralleling a plurality of the multifilament yarns;
   either twisting the plurality of yarn threads to obtain a net constructed with strands and intersections, or braiding the plurality of yarn threads to obtain a net constructed with strands and intersections:
   heat-treating the net without added pressure to melt the sheath component of the yarn threads constituting the strands and the intersections, followed by solidifying, thus obtaining a plastic net constructed with solidified strands and solidified intersections, in which the core component is existent as an initial fiber form in a matrix formed of the sheath component; and
   forming a fishing net using the plastic net.

2. The method according to claim 1, wherein the polyolefin is polyethylene.

3. The method according to claim 1, wherein the plurality of yarn threads are twisted when braided.

4. The method according to claim 1, wherein the intersections are knotless.

* * * * *